United States Patent [19]

Blair

[11] Patent Number: 4,648,188
[45] Date of Patent: Mar. 10, 1987

[54] THREE DIMENSIONAL IMAGE WITH PICTURE COVERING AND FORMING SYSTEM

[76] Inventor: June L. Blair, 8408 N. 44th St., Omaha, Nebr. 68112

[21] Appl. No.: 768,813

[22] Filed: Aug. 23, 1985

Related U.S. Application Data

[63] Continuation-in-part of Ser. No. 720,527, Apr. 5, 1985, which is a continuation-in-part of Ser. No. 620,696, Jun. 14, 1984, abandoned.

[51] Int. Cl.$^4$ ............................................. G09F 1/08
[52] U.S. Cl. .................................. 40/538; 446/391; 434/81; 434/82; 434/267
[58] Field of Search ................. 40/160, 548, 158 R, 40/538; 446/391, 372, 97, 27; 434/82, 81, 267, 270; 132/73

[56] References Cited

U.S. PATENT DOCUMENTS

| | | | |
|---|---|---|---|
| 43,882 | 8/1864 | Wilieme | 434/81 |
| 46,270 | 2/1865 | Salle | 446/391 |
| 298,921 | 5/1884 | Van Campen | 132/73 |
| 1,480,198 | 1/1924 | Denkhoff | 434/81 |
| 1,540,384 | 6/1925 | Bloom | 446/391 |
| 1,942,370 | 1/1934 | Jacobson | 446/97 |
| 2,309,447 | 1/1943 | Greneker | 40/538 |
| 2,468,731 | 5/1949 | Borkland | 40/160 |
| 2,711,039 | 6/1955 | Wittman | 40/158 R |
| 3,315,391 | 4/1967 | Lane et al. | 40/548 |
| 4,294,634 | 10/1981 | Mookil | 434/267 |

FOREIGN PATENT DOCUMENTS

| | | | |
|---|---|---|---|
| 987418 | 3/1965 | United Kingdom | 434/82 |
| 2088109 | 6/1982 | United Kingdom | 350/117 |

*Primary Examiner*—Gene Mancene
*Assistant Examiner*—J. Hakomaki
*Attorney, Agent, or Firm*—James D. Welch

[57] ABSTRACT

A process for producing three dimensional pictures which begins with a photograph. A mold is first sculptured by affixing a picture of the image in the photograph to a pliable mass such as clay, and then sculpturing the mass using the picture as a guide as to where to place elevations and depressions. Next, the photograph is subjected to steps which result in the removal of the backing, and the lamination of the photograph with the backing removed in plastic. Next a "Vacu-Form" machine is used to heat soften the laminated photograph and then suction pull the combination over the mold. The mold and the photograph are alligned during the pulling step and the result is that the photograph takes on a third dimension which has elevation and depressions placed as they should be placed by reference to the image in the photograph. The result is an article which retains a third dimension with no need of any supporting materials.

Optional steps involve mounting the three dimensional picture in a display device, or combining a number of the three dimensional pictures so as to form an object. As well, cosmetic materials can be applied to the three dimensional picture to improve the appearance.

3 Claims, 3 Drawing Figures

THREE DIMENSIONAL IMAGE WITH PICTURE COVERING AND FORMING SYSTEM

The subject matter of this application has been the subject of U.S. patent application Ser. No. 620,696 filed on June 14, 1984 now abandoned title "Three Dimensional Image With Picture Covering and Forming System", and of a U.S. continuation-in-part application submitted on Apr. 5, 1985, Ser. No. 720,527. This application is a further continuation-in-part and priority is based upon the indicated co-pending applications.

SUMMARY OF THE INVENTION

This invention involves three dimensional pictures, a method for producing three dimensional pictures, and more particularily a method for combining pictures, preferably photographs, with sculptures in a fashion which allows sculpturing to take place using the picture as a guide.

Prior attempts at combining pictures and sculptures involved independent formation of a sculpture, the cutting of a picture into pieces and the attaching of said pieces to the sculpture. The result achieved was of "Frankinstein" quality.

The method of the invention herein involves the attaching of a pliable picture containing film to a pliable mass, either directly or via an intermediary flexible sack. Next, the pliable mass is manipulated, using the picture as a guide, into a sculpture providing elevations and depressions positioned so as to enhance the picture and cause it to become three dimensional.

Multiple manipulated pliable masses with sculpture guiding pictures affixed to the front thereof can be combined to form fully three dimensional objects which appear very "real".

The method continues to the end that an article of manufacture is produced, and additional steps include the lamination of a pliable picture containing film into a sheet of plastic; the subjecting of the sculptured pliable mass to a hardening process; the mounting of the hardened sculptured pliable mass and the plastic laminated picture contained in the pliable film into a "Vacu-Form" machine; and the use of the "Vacu-Form" machine to cause the picture in the pliable film to take on a third dimension, and can include the use of adhesives, needle and thread, stuffing materials and cosmetics.

In the picture is that of a face of a person the article of manufacture can become a doll. As well a tape recorder can be therein. The person whose face is on the doll can add his or her voice to the result.

The method herein can be practiced by individual human effort, or by machine, which includes computer aided devices. The later are useful in image production as well as in sculpture formation.

Accordingly, it is a general object of this invention to provide a new art form.

It is another general object of this invention to provide a method for production of three dimensional pictures.

It is a specific object of this invention to provide a method by which photographs can be transformed into three dimensional pictures and objects.

It is yet another specific object of this invention to provide a method by which photographs of human faces can be converted into very "real" appearing three dimensional faces for mounting in dolls' heads.

TECHNICAL FIELD

Figure 1:
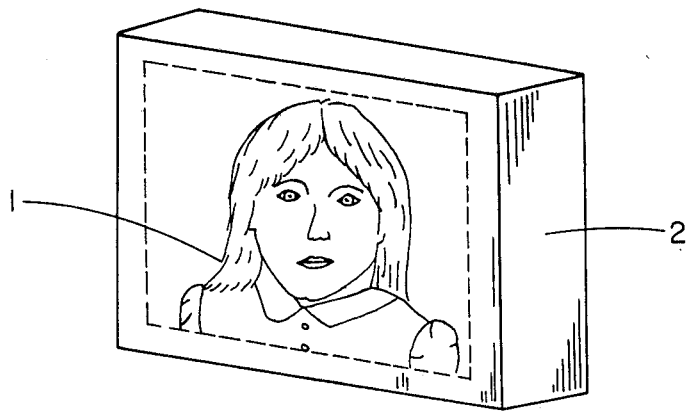
FIG. 1 is a perspective view of a picture mounted on a pliable mass prior to manipulation of the pliable mass into a sculpture.

This invention relates to three dimensional pictures and objects and more particularly to a method for producing very "real" appearing combinations of photographic pictures and sculptures.

Processes involving use of "vacu-form" machines, "injection" and "blow" moulding machines and pour moulding are also included. Use of computer aided image production is also mentioned.

BACKGROUND ART

Over the years the creative nature of the human spirit has expressed itself through the arts. Numerous methods and processes have been developed and evolved, the practice of which allow production of physical items which communicate the concept and message intended by their creator to others. Commonplace examples of such methods and processes are pictures and sculptures.

Existing art provides examples of efforts directed toward combining various modes of expression, relevant evidence of which is found in a patent to Greneker, issued in 1943, U.S. Pat. No. 2,309,447, titled "Display Device and Method of Making the Same". Greneker disclosed a method for production of manikin sculpture to the face of which was affixed cut up portions of photographs. The purpose of the method was to produce a "real" appearing end result. A problem with the Greneker process, however, was that placing pieces of a two dimensional photo onto a presculptured manikin face resulted in a distorted result, with gaps existing between the various pieces of photograph. Arguably the Greneker process produced results which were inferior to that achieved by simply painting the manikin face.

Another attempt to produce combinations of pictures and sculpture involves placing a picture on a thin sheet of copper, or other suitable pliable material, then impressing into the copper depressions and elevations from behind the picture. The sculpturing causes three dimensional effects and makes the picture seem more real, however, the end result remains relatively flat.

A need exists for a method by which pictures, preferrably photographs, can be combined with sculptures to produce a "real" appearing three dimensional result. A typical application for such a method is in the production of dolls with human faces thereon. The method necessarily must allow for producing sculpture which is guided by the picture.

DISCLOSURE OF THE INVENTION

A method for producing "reel" appearing three dimensional pictures and objects, which combines pictures, preferrably photographs, and sculptures, is the subject of this disclosure. The method is based in the fact that pictures can be contained in very thin pliable films. An excellent example of such a film is the result provided by removing the paper-cardboard from the back of a photograph. The method herein involves placing such a picture-containing-film onto a pliable mass of material which can be, but is not necessarily, clay. The method involves sculpturing of the pliable mass through the picture, using the picture as a guide. If the picture is of a human face, for example, the pliable material will be sculptured so as to provide elevated nose and depressed eye areas. In U.S. patent applications 620,696 and 720,527 this was stated as ". . . it is possible . . . to shape the molding material . . . by pressing on the flexible picture-front module . . . as guided by the face on the picture-front module", and it was stated in the indicated applications that the process is not limited to production of faces.

The method, initiated above, can be augmented in a non-preferred embodiment, by placing the pliable mass into a flexible sack which has a picture image impressed thereon and using said image as the guide to sculpturing. Later an actual picture can be attached to the sack by means of adhesives, and/or needle and thread, etc. Stuffing materials can be used to add to the three dimensional effect created during this process. In U.S. patent applications 620,696 and 720,527 this was disclosed as ". . . what hasn't been known is . . . using as an outermost layer a photographically printed material so that as the stitching is done, the face takes on the form of the photograph." It is possible to form the sack from photograph films directly.

The method is continued in the preferred embodiment, use of a "Vacu-Form" machine process. After the pliable mass is manipulated into a sculpture it can be hardened. In the case where the pliable mass is clay a heat treatment might be used. The hardened result can then be placed upon a "Vacu-Form" machine stage. A copy of the picture can be placed into plastic laminations and the combination placed into the "Vacu-Form" machine as well, where it is heated. The heat softened picture-lamination combination can then be suction pulled over the hardened pliable mass. This allows for mass production of "pulled" three dimensional pictures, but the approach can be used when a single picture is desired as well. The "Vacu-Form" pulling process provides a very "real" appearing result. Injection, blow or poured moulding machines and processes can be used to produce mounting structures for the results.

A further addition to the basic process involves the production of a number of sculptured pictures, each being of one side of, or the top, front, back or bottom of a fully three dimensional object. The combining of said sculptured pictures then results in a true replication of a fully three dimensional object.

An additional step can be to optimize the result with paints or other cosmetic materials.

In the case where the process is used to produce a human face, a doll can be produced which includes a tape recorder placed inside the doll which contains a recording of the voice of the person whose face is on same.

The method of this invention can be practiced by individual human effort or by automated machine.

DETAILED DESCRIPTION

Figure 2:
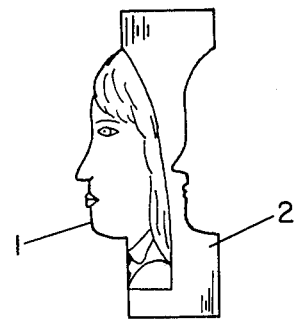
FIG. 2 is a side view of a picture mounted on a pliable mass after manipulation of the pliable mass into a sculpture, using the picture as a guide.

Referring now to FIG. 1, the starting point for the method is a photograph or other picture (1), embodied in a flexible pliable film. A photograph from which the backing has been removed is an excellent example. The picture is placed in contact with a pliable mass of material (2) which can be, but is not limited to, clay. An alternate embodiment provides for transferring a picture to a flexible material which forms a sack, which in turn contains the pliable mass of material. Note that a sack can be formed by combining photographs directly. Next the pliable mass is manipulated through the picture(s) in a manner which adds a third dimension by causing there to be elevations and depressions at locations directed by the picture, (See FIG. 2).

Figure 3:
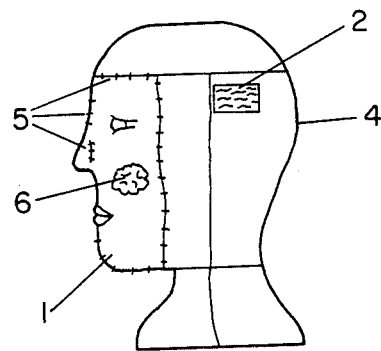
FIG. 3 is a side view of a picture stitched to a sack which contains a pliable mass which has been manipulated into a sculpture. The sack is comprised of a multiplicity of pieces connected to one another.

Next the pliable mass, in its sculptured form, is hardened, perhaps by a heating process, but not limited to such. The hardening process can be accomplished with the picture attached to the pliable mass, or with the picture removed. If the picture was removed during the hardening process it is then remounted and held in place by adhesives or other means which do not detract from the appearance. If the pliable mass was manipulated while in a flexible sack, it can be replaced back into the sack prior to mounting the picture (See FIG. 3). If the hardened pliable mass (2) is replaced into a sack (4) the picture (1), or a replica of same, can be attached the sack by use of needle and thread (5). Stuffing materials (6) can be placed at appropriate locations under the picture during this step to further enhance the three dimensional effect. Once the picture is mounted the article of manufacture can be placed in a display unit, which in the case where the picture was that of a human face, can be a doll head. Injection, blow or poured moulding machines and processes can be used to form the display unit.

Further, the hardened sculptured pliable mass is, in the preferred embodiment, used in conjunction with a "Vacu-Form" machine process. The additional steps required are the placing of the hardened sculpture onto the stage of a "Vacu-Form" machine, the placing of a corresponding picture in clear laminated plastic, the alligning and mounting of the picture-laminated clear plastic composite into the "Vacu-Form" machine, the heating of the picture-laminated plastic composite, and the suction pulling of the heated picture-laminated plastic composite over the hardened sculpture. This procedure is especially well suited to mass production of many units of a single picture.

A "Vacu-Form" machine is a device which accepts materials which can be made pliable by the application of heat, such as plastic sheets or films. Such materials are subjected to a heating process in the "Vacu-Form" machine, and then caused to be suction pulled over a three dimensional object which is present on the stage of the machine. The stage of the machine has numerous holes in it which allow air to be sucked through. The process causes the heat softened material to take on the shape of the three dimensional object on the stage of the "Vacu-Form" machine.

A further extension of the process involves the production of numerous hardened sculptured pliable masses with pictures attached, each being shaped so as to fit together with the other parts to form a fully three dimensional object. The pictures on each part being taken from an angle so that they represent accurately the part of the object they portray, and the number of pieces being great enough so that no picture is unrealistically distorted by the sculpturing process.

. Having hereby disclosed the subject matter of this invention, it should be obvious that many modifications, substitutions and variations of the present invention are possible in light of the above teachings. It is therefore to be understood that the invention may be practiced other than as specifically described and should be limited in breadth and scope only by the appended claims.

I claim:

1. A method of producing three dimensional pictures comprising:
   providing a photograph;
   removing the backing from the photograph;
   producing a picture of the photograph on a pliable film of material;
   mounting the picture of the photograph which is on the pliable film of material onto a pliable mass of material;
   manipulating the pliable mass of material through the picture of the photograph which is on the pliable film of material, using the picture as a guide as to where to sculpture elevations and depressions;
   subjecting the manipulated, sculptured, pliable mass of material to a hardening process;
   placing the photograph with the backing removed into plastic by a lamination process so that the photograph with the backing removed can be seen through the top plastic covering;
   placing the hardened manipulated, sculptured, pliable mass of material into a "Vacu-Form" machine, on the stage thereof;
   simultaneous with the prior step, placing the photograph with the backing removed, which is laminated in plastic, into the "Vacu-Form" machine such that it is aligned with the hardened manipulated, sculptured, pliable mass of material on the stage of the "Vacu-Form" machine;
   operatig the "Vacu-Form" machine to heat soften the photograph with the backing removed which is laminated in plastic, and the plastic itself;
   further operating the "Vacu-Form" machine to suction pull the heat softened photograph with the backing removed, and which is laminated in plastic, over the hardened manipulated, sculptured mass of material in alignment with said photograph with the backing removed, on the stage of the "Vacu-Form" machine.

2. A method of producing three dimensional pictures, as in claim 1 which further comprises:
   cutting the photograph with the backing removed which is laminated in plastic and impressed with a third dimension, to eliminate any excess plastic around the picture with the backing removed and laminated in said plastic;
   mounting the cut-to-size photograph with the backing removed, which is laminated in plstic and which has been impressed with a third dimension in a display unit, which can be a doll head.

3. A method of producing three dimensional pictures, as in claim 2 which further comprises:
   the adding of cosmetic materials to the photograph with the backing removed which is laminated in plastic and impressed with a third dimension, to improve the appearance thereof.

* * * * *